United States Patent [19]
Whitesell

[11] Patent Number: 5,356,253
[45] Date of Patent: Oct. 18, 1994

[54] SHEET METAL SCREW

[76] Inventor: Neil L. Whitesell, 2703 Avalon Ave., Muscle Shoals, Ala. 35662-2571

[21] Appl. No.: 875,732

[22] Filed: Apr. 29, 1992

[51] Int. Cl.$^5$ ............... F16B 39/282; F16B 23/00
[52] U.S. Cl. .................. 411/188; 411/399; 411/426
[58] Field of Search .......... 411/147, 160–162, 411/186–189, 369, 386, 387, 399, 426

[56] References Cited

U.S. PATENT DOCUMENTS

| | | | |
|---|---|---|---|
| 3,208,328 | 9/1965 | Myers | 411/386 |
| 3,286,579 | 11/1966 | Lovisek | 411/386 |
| 3,661,046 | 5/1972 | Wand et al. | 411/369 |
| 3,752,030 | 8/1973 | Steurer . | |
| 4,103,725 | 8/1978 | Abe | 411/160 |
| 4,223,711 | 9/1980 | Tabor | 411/188 |
| 4,377,361 | 3/1983 | Frieberg | 411/188 |
| 4,518,294 | 5/1985 | Barth | 411/399 |
| 4,812,095 | 3/1989 | Piacenti et al. | 411/188 |
| 5,183,359 | 2/1993 | Barth | 411/188 |
| 5,252,016 | 10/1993 | Schmid et al. | 411/426 X |

FOREIGN PATENT DOCUMENTS

| | | | |
|---|---|---|---|
| 2908499 | 9/1980 | Fed. Rep. of Germany | 411/188 |
| 2461138 | 1/1981 | France . | |

Primary Examiner—Neill R. Wilson
Attorney, Agent, or Firm—I. C. Waddey, Jr.

[57] ABSTRACT

The present invention discloses a screw for use with very thin sheet metal. The screw has a head and a shank which has a first and relatively very short tapered section and a second, longer, substantially cylindrical section. The first section attaches to the underside of the head on one end and to the cylindrical section on the other. The first section is broader at the end attached to the head and carries two or fewer turns of threads. The second section of the shank carries uniform threads that are continous with the threads on the first section. The underside of the head also has locking serrations which are triangular, having an included angle of 28 degrees and gradually increase in height at slope of 8–10 degrees with a length of approximately twice their height at their highest point.

6 Claims, 2 Drawing Sheets

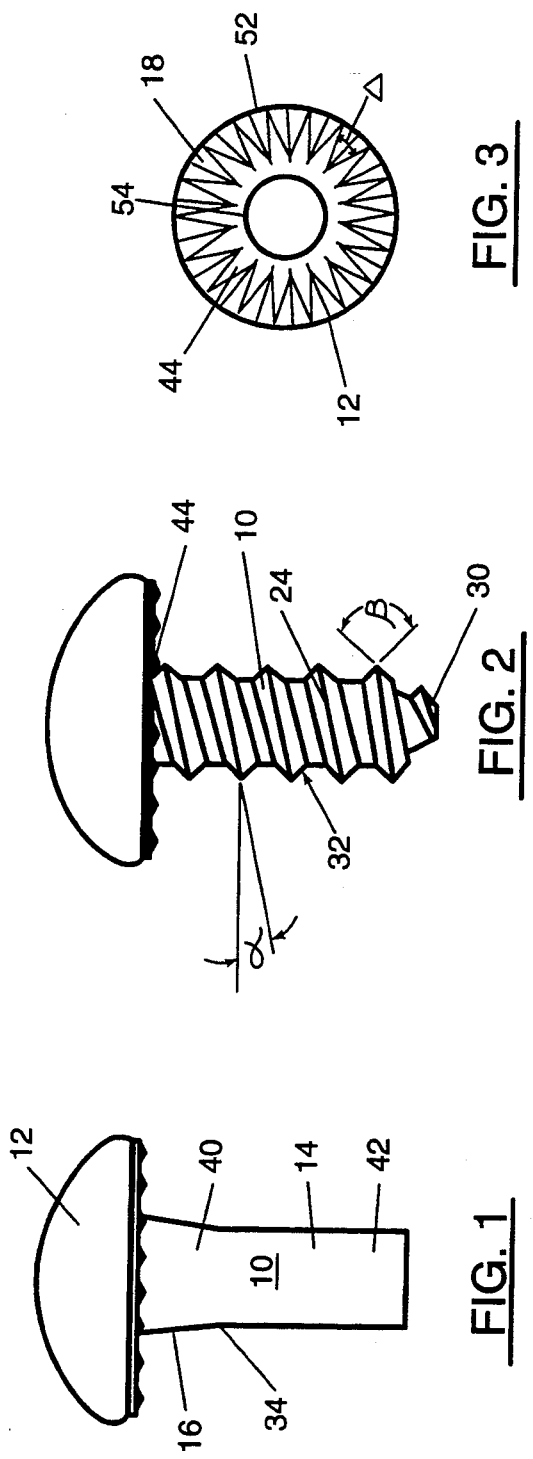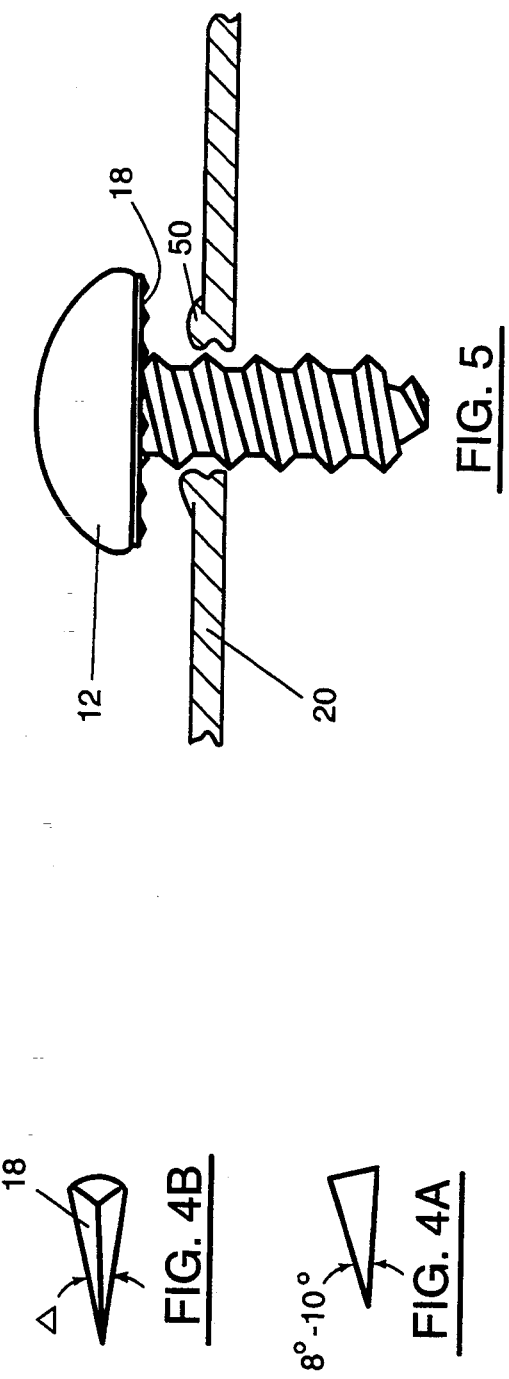

SHEET METAL SCREW

BACKGROUND OF THE INVENTION

My invention relates generally to a sheet metal screw and more particularly to a sheet metal screw with a head, a shank having a substantially long parallel section distally located from said head and a relatively shorter tapered section proximate to the head. The head has locking serrations on its underside.

It will be appreciated by those skilled in the art that sheet metal screws must be specifically designed. It will be further appreciated by those skilled in the art that sheet metal used to assemble products such as electrical appliances are becoming thinner and thinner. This increases the likelihood that the screw in the manufacturing of such appliances will cause the sheet metal to be stripped out as it is torqued into the sheet metal thereby creating a useless piece of thin sheet metal. Further, if the sheet metal screws are made as soft as the sheet metal to prevent the sheet metal from being stripped, the heads of the screw can easily be torqued off. To this end, there have been several attempts to design a screw that is useable in connection with thin sheet metal applications.

One such attempt is disclosed in U.S. Pat. No. 3,752,030, issued to Steurer on Aug. 14, 1973. Steurer discloses a section of shank which is not tapered followed by a gradually and progressively increasingly tapered section which will expand the pilot hole and gradually compress the metal surrounding the hole. Unfortunately, the long and gradually extending taper actually can create the stripping which Steurer seeks to prevent. Tapering causes the sheet metal to curl toward the head. If the taper extends over too great a length, the curling will strip the metal.

Another such attempt is disclosed in French Patent No. 79 17837 issued on Jan. 30, 1981 to Francois Klein The Klein patent discloses a head having, on its underside, radial ribs. Unfortunately, Klein was intended for use with wood and the ribbing can not prevent the type of stripping and improved attachment which is needed.

What is needed, then, is a sheet metal screw which has a taper which improves the attachment between the screw and the sheet metal yet prevents the stripping of the sheet metal by a screw having too great of a taper. Further, a screw is needed which can take advantage of the curl up which is created by the engagement of a tapered screw in sheet metal. This sheet metal screw is presently lacking in the prior art.

SUMMARY OF THE INVENTION

The present invention overcomes deficiency of the prior art by providing a sheet metal screw having a shank which has a large substantially cylinderical section followed by a considerably shorter tapered section such that the taper only occurs during the last one or two turns of the screw. The screw also has serrations on the underside of the head to engage the metal-curling which is caused by turning the tapered section of the Screw into the sheet metal.

Accordingly, one object of the present invention is to provide a sheet metal screw which does not strip sheet metal.

Another object of the present invention is to provide a sheet metal screw which takes advantage of the curl up caused by turning a tapered screw into a sheet of sheet metal.

Still another object of the present invention is to allow the user of the sheet metal screw to place sufficient torque on the screw to insure attachment without being Concerned about over torque which will strip threads or break the screw.

DESCRIPTION OF THE DRAWINGS

FIG. 1 is a side view of the stock for the sheet metal screw of the present invention without threads and a tip.

FIG. 2 is a side view of the sheet metal screw of the present invention.

FIG. 3 is a underside plan view of the sheet metal screw of the present invention.

FIG. 4A is a side view of the serration contained on the underside of the head of the sheet metal screw of the present invention.

FIG. 4B is a top view of the serration contained on the underside of the head of the sheet metal screw of the present invention.

FIG. 5 is a side view of the sheet metal screw of the present invention as it cooperates with sheet metal.

DESCRIPTION OF THE PREFERRED EMBODIMENT

Figure 6:
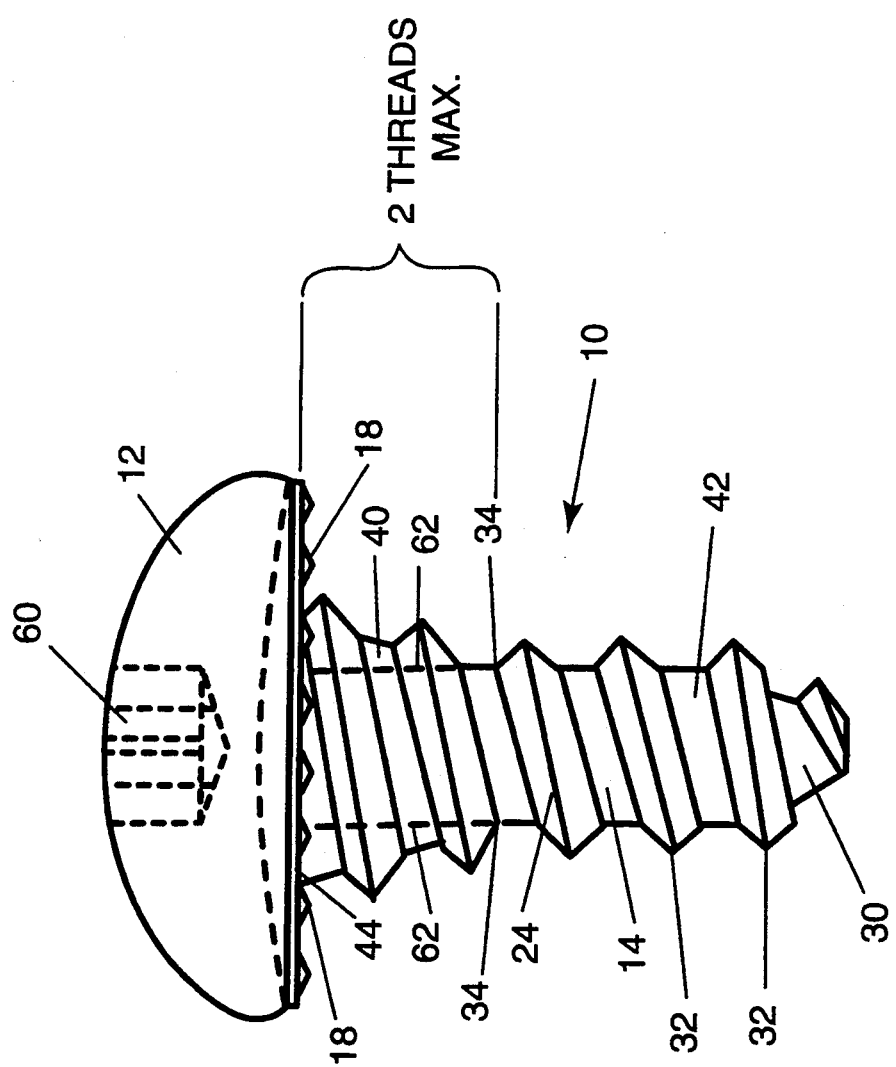
FIG. 6 is a side view of the sheet metal screw of the present invention in exaggerated view showing the length of the tapered section of the screw with a maximum of two threads.

Referring now to FIG. 1, there is shown generally at 10 the sheet metal screw of the present invention without threads (32 in FIG. 2). Sheet metal screw 10 has head 12 and shank 14. Shank 14 has first section 40 which is tapered and second section 42 which is substantially cylindrical. First section 40 ends and second section 42 begins at point 34. Head 12 should include one of several known type of driver recesses such as a square "Robertson" recess 60 as shown in FIG. 6 for connection with a standard driver. On the under side of head 12 there are serrations 18. In the preferred embodiment of this type screw, second section 42 of shank 14 is between. 0.133 to 0.135 inches. In the preferred embodiment, first or tapered section 40 is substantially 0.143 inches long and extends to a diameter of substantially 0.141 to 0.142 inches. Taper 16 of first section 40 is substantially 2°-1 ½° per side to the axis of the shank 14. In the preferred embodiment, shank 14 is substantially 0.3 inches to 0.310 inches long from head 12 to beginning of tip 30. Variations in size of the screw should be proportioned to these dimensions.

Referring now to FIG. 2, there is shown generally at 10, sheet metal screw of FIG. 1 having threads 32 and tip 30. The entire length of shank 14 from base 44 to tip 30 is substantially 0.345 to 0.385 inches. In the preferred embodiment, helix 24 of threads 32 is at an angle $\alpha$ substantially 10° to a line perpendicular to the axis of the screw, whereas included angle $\beta$ of threads 32 is substantially 60°.

FIG. 6 shows a side view of the screw of the present invention in an exaggerated size to illustrate in detail certain features of the invention. As can be seen from FIG. 6, the screw has a head 12 with a driver socket 60 contained in the top thereof. The underside of the head 12 has a base 44 and serrations 18 are on the base 44. The tapered section 40 is exaggerated in the illustration shown in FIG. 3, and dotted lines 62 are provided simply for the purposes of illustrating a comparison of the tapered section 40 with the substantially cylindrical second section 42 of the shank of the screw. The connection point 34 where the tapered section meets the second section of 42 of the shank is more clearly illustrated in FIG. 6 and demonstrates the taper of the first section 40 from the base 44 of the head 12 down to the point of connection between the first section 40 and the second section 42 of the shank. As can be more clearly seen from the exploded view of FIG. 6, the tapered section 40 runs from the point of connection between the tapered section 40 and second section 42 up to the base 44 of the head 12 and a maximum of two threads 32 are formed in the tapered section 40. FIG. 6 also illustrates clearly how the widest portion of the tapered section 40 is substantially integral with the base 44.

Referring now to FIG. 3, there is shown generally at 10 the underside plain view of the screw in FIG. 1. As can be seen from FIG. 3, base 44 of head 12 has locking serrations 18. The serrations 18 have an 8°–10° slope (when compared to a plane perpendicular to the axis of the shank) from their start at a point near the center of the head to its periphery. They are triangular in shape and expand from a point radially removed from the shank 14 with an included angle Δ of 28°. The serrations are shown in detail in FIGS. 4A and 4B.

As can be seen from FIG. 3, the serrations cover an area of the base 44 of the head 12 defined as follows: divide the radial dimension of the base 44 from the outer periphery 52 of the shank 14 to the periphery 54 of the shank 14 into three approximately equal parts; the serrations cover the outer two-thirds of the radial portion of the base and have a height at their apex near the periphery of the base 44 of approximately one-half their length.

Referring now to FIGS. 1–3 in combination, tip 30 starts hole 48 (FIG. 5) in sheet metal 20 (FIG. 5). The hole 48 in sheet metal 20 expands sufficient to allow second section 42 of shank 14 to pass. When screw 10 reaches point 34, shank 14 tapers over the last one plus turns thereby causing sheet metal 20 to curl up toward base 44 of head 12. This curling coordinates with serrations 18 to lock screw 10 in place.

FIG. 5 demonstrates the cooperation between tapered section 40, serrations 18, and sheet metal 20. As first section 40 passes through sheet metal 20, curling 50 occurs. As head 12 approaches sheet metal 20, curl 50 approaches head 12 at a faster rate. Curl 50 then meets serrations 18 which aids in locking screw 10 in place. The material created by curl 50 expands radially into the valleys between serrations 18 as the peaks of the serrations 18 dig into the sheet metal 20, thus causing a secure locking between the sheet metal and the screw.

Thus, although there have been described particular embodiments of the present invention of a new and useful sheet metal screw, it is not intended that such references be construed. as limitations upon the scope of this invention, except as set forth in the following claims. Further, although specific dimensions have been suggested, it is not intended that such dimensions limit the scope of the present invention except as set forth in the following claims.

I claim:

1. A screw for use with sheet metal, said screw having an axis and comprising:
    a. a head having an upper side and underside, said underside having serrations;
    b. a shank having threads throughout the entire length thereof, said shank attached to said underside of said head, said shank having a first tapered section and a second substantially cylindrical section, said first tapered section being conical in shape and narrowing along its length as it recedes from the head, the widest portion of said first tapered section being integral with the underside of the head, the narrowest portion of said first tapered section being the same diameter as and integral with one end of the said second substantially cylindrical section, said first section being of a length that carries between one and two turns of the said threads.

2. A screw for use with sheet metal, said screw having an axis and comprising:
    a. a head having an upper side and underside, said underside having serrations; said serrations being triangular in shape, having an included angle of 28°, the tips of the included angles pointing toward the axis of the screw so that the serrations widen throughout their length as they extend along the underside of the head from a point adjacent where the shank attaches to the head radially from the axis of the screw, having a slope of 8°–10° projecting axially from the underside of the head and increasing in height as they extend along the underside of the head from a point adjacent where the shank attaches to the head radially from the axis of the screw, and having a length of approximately two times their height;
    b. a shank having threads throughout the entire length thereof, said shank attached to said underside of said head, said shank having a first tapered section and a second substantially cylindrical section, said first tapered section being conical in shape and narrowing along its length as it recedes from the head, the widest portion of said first tapered section being integral with the underside of the head, the narrowest portion of said first tapered section being the same diameter as and integral with one end of the said second substantially cylindrical section, said first section being of a length that carries between one and two turns of the said threads.

3. The screw of claim 1 wherein said threads pass around said first section less than two times.

4. A screw for use in sheet metal, said screw having a shank attached to a head, wherein:
    a. said head has an underside;
    b. said shank comprises a first section proximate to said head wherein said first section is tapered to grow larger as said first section approaches said head with the largest portion of said first section being integral with the underside of said head and a second section having substantially parallel sides and said first section attaches to said second section;
    c. said shank including a thread running helically around said shank;
    d. more than three quarters of a thread and less than two threads on said first section; and
    e. locking serrations proximate to said underside of said head.

5. The device of claim 4 wherein said taper is at an angle of 3° to the axis of the shank.

6. The device of claim 4 wherein said locking serrations are attached to said underside of said head.

* * * * *